(12) United States Patent
Stevens et al.

(10) Patent No.: US 10,992,657 B1
(45) Date of Patent: Apr. 27, 2021

(54) MULTI-ACCOUNT ENTITY BASED ACCESS CONTROL

(71) Applicant: Amazon Technologies, Inc., Seattle, WA (US)

(72) Inventors: Joshua Eugene Stevens, Austin, TX (US); Bijendra Singh, Cedar Park, TX (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 15/967,168

(22) Filed: Apr. 30, 2018

(51) Int. Cl.
*H04L 29/06* (2006.01)

(52) U.S. Cl.
CPC ........ *H04L 63/0815* (2013.01); *H04L 63/102* (2013.01)

(58) Field of Classification Search
CPC ..... G06F 21/31; G06F 21/44; H04L 63/0815; H04L 63/102
See application file for complete search history.

(56) References Cited

U.S. PATENT DOCUMENTS

| | | | | |
|---|---|---|---|---|
| 8,051,491 B1* | 11/2011 | Gavage | ................... | H04L 63/10 726/30 |
| 2011/0225298 A1* | 9/2011 | Brown | ................... | G06F 9/505 709/226 |
| 2015/0135287 A1* | 5/2015 | Medeiros | ................ | G06F 21/50 726/5 |
| 2015/0294377 A1* | 10/2015 | Chow | ................ | G06Q 30/0282 705/347 |
| 2017/0012967 A1* | 1/2017 | Holloway | ............. | H04L 9/3247 |
| 2017/0295183 A1* | 10/2017 | Movsisyan | ........... | H04L 63/105 |
| 2019/0089694 A1* | 3/2019 | Newton | ................... | G06F 21/41 |
| 2019/0199706 A1* | 6/2019 | Hua | ........................ | G06F 21/41 |

OTHER PUBLICATIONS

M. Lorch • D. Kafura • I. Fisk • K. Keahey • G. Carcassi • T. Freeman • T. Peremutov • A.S. Rana; Authorization and account management in the Open Science Grid; The 6th IEEE/ACM International Workshop on Grid Computing, 2005. (p. 8 pp.); (Year: 2005).*

Katanosh Morovat • Brajendra Panda; Request Evaluation for Policy-Based Attribute Access Control in Social Network Cloud; 2016 IEEE International Conference on Computer and Information Technology (CIT) (pp. 399-406); (Year: 2016).*

Yousra Asim • Wajeeha Naeem • Ahmad Kamran Malik; A community-centric access control scheme for Online Social Networks; 2017 International Conference on Communication, Computing and Digital Systems (C-CODE) (pp. 222-227); (Year: 2017).*

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from http://csrc.nist.gov/publications/nistpubs/800-107-rev1/sp800-107-rev1.pdf, 25 pages.

* cited by examiner

Primary Examiner — Luu T Pham
Assistant Examiner — Chao Wang
(74) Attorney, Agent, or Firm — Davis Wright Tremaine LLP

(57) ABSTRACT

A plurality of attributes associated with a user of an account making a request is determined based on the received request. One or more operations to grant the user access to the one or more resources of the second account are determined based on the attributes. Access is provided to one or more resources of the second account according to the one or more operations to fulfill the request.

20 Claims, 8 Drawing Sheets

MULTI-ACCOUNT ENTITY BASED ACCESS CONTROL

BACKGROUND

As cloud-based computing resource service providers become more prevalent in use, there is a greater and greater need to enable cross account utilization scenarios as a result of business demands. Often times, organizing computing resources in a maintainable fashion and providing high levels of security are difficult to achieve simultaneously it is often simplest to manage all computing resources into one account that is centrally managed. However, such an approach leads to difficulties for large organizations including billing and financial accounting gaps for organizations that require infrastructure to be separated for various reasons such as regulatory and compliance. A "flat" hierarchy as described above may also require considerable resources to avoid security gaps and potential vulnerabilities by not implementing security based on least privilege principles. Implementing least privilege and, generally the management of permissions, can be difficult, especially in complex systems with multiple users and multiple resources. Alternatively, organizations have attempted to keep accounts separate and tie them together using a directory infrastructure. However, there are challenges in implementing and managing such a system across multiple user accounts in a scalable and tenable manner.

BRIEF DESCRIPTION OF THE DRAWINGS

Various techniques will be described with reference to the drawings, in which.

DETAILED DESCRIPTION

Figure 1:
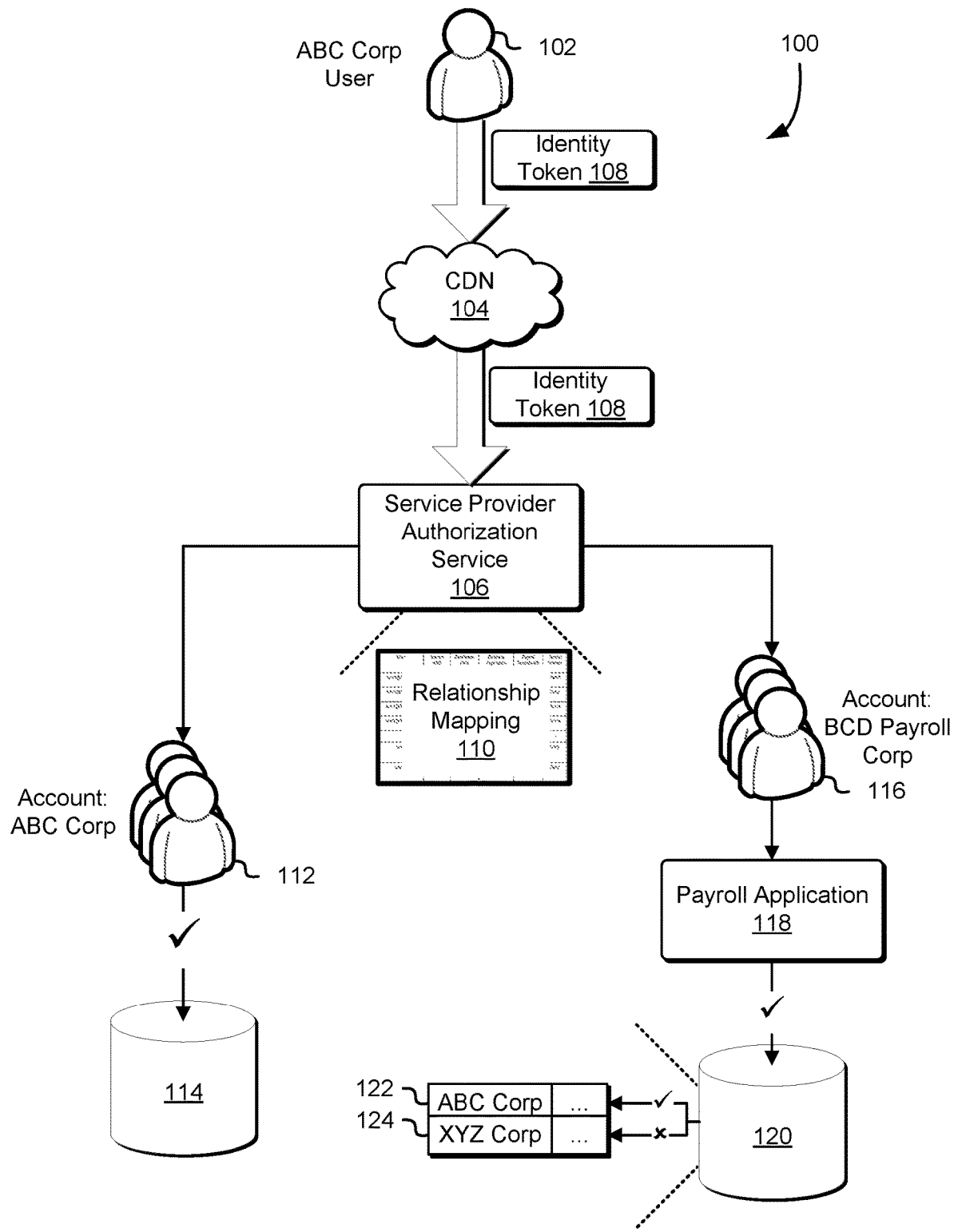
FIG. 1 illustrates a system in which one embodiment may be practiced.

In an embodiment, a computing resource created by a first user of a first account is accessible to one or more users of the first account the user that creates a computing resource such as a data object stored in a bucket of a data storage service may have access to read from and write to the data object. In an embodiment, the computing resource created within the first account is not accessible to other accounts of the computing resource service provider if a first user of a first account (e.g., an employee of ABC Corp) creates a data object, that data object may be accessible to other uses of the first account, but not to users of another account (e.g., an employee of BCD Payroll Corp) without the use of a service provider authorization service.

In an embodiment, a service provider authorization service is utilized to provide customizable access to computing resources, including computing resources across multiple accounts. In an embodiment, a user of a first account establishes a user session that can be utilized to submit requests to access various resources within the context of the first account, such as computing resources owned, provisioned, and operated on behalf of the account and the account owner. In an embodiment, the user of the first account is able to utilize the service provider authorization service to manage and access resources across accounts and across regions.

In an embodiment, the user submits a request to a service provider authorization service that includes one or more technical attributes about the user such as the user's identity, associated account, and more. In an embodiment, additional technical attributes are collected by a content delivery network or other computing devices that are used to route the request to the service provider authorization service. The technical attributes, in an embodiment, include user and account level attribute that are assigned sub-scores, and aggregated to determine a digital fingerprint of the requestor, which is used in a many-to-many mapping that defines the manner in which cross-region and cross-account resource are to be accessed as well as a mode of authentication that defines how the user is able to successfully complete an authentication routine to gain access to the computing resource.

In an embodiment, the service provider authorization service manages granular mappings of relationships between multiple users and accounts to provide programmatic access for both multiple disparate accounts and users in a seamless manner. In an embodiment, the service provider authorization service utilizes an access cube and a relationship mapping table to centrally manage complex permissions for multiple users across multiple accounts.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments are capable of achieving certain advantages, including some or all of the following: facilitating cross region service account access, facilitating regionalization of computing resource service provider resources, providing programmatic access for multiple disparate computing accounts and multiple disparate computing users into individual or multiple account subscriptions in a seamless manner, and combinations thereof. As computing resource service providers become a prevalent resource for larger organizations to utilize, the need for cross region utilization may increase and regionalization of computing resources of the computing resource service provider may be desired. Cross account utilization of computing resources in a scalable manner that manages one or more of: authentication, authorization, and accounting for multiple accounts.

In an embodiment, FIG. 1 illustrates a diagram of a system 100 in which an embodiment in accordance with this disclosure can be implemented. In an embodiment, the system 100 includes a client 102, a content delivery network (CDN) 104, a service provider authorization service 106, an identity token 108, a relationship mapping 110, a first account of a computing resource service provider 112, a first set of computing resources 114, a second account of a computing resource service provider 116, a software application 118, and a second set of computing resources 120, wherein the second set of computing resources 120 includes some accessible resources 122 and some inaccessible resources 124.

In an embodiment, the user 102 illustrated in FIG. 1 refers to a user controlling a computing device that is utilized by a client to perform electronic communications, issue requests, submit commands, etc. In an embodiment, the user 102 is an authenticated user of an account that is managed through a computing resource service provider. In an embodiment, a computing resource service provider refers to one or more computer servers that provide access to a variety of computing resources such as various types of storage resources, compute resources, software applications, etc. In an embodiment, an account enables use of a computing resource service provider, and the account may be used to view account activity, usage reports, and manage service provider security credentials. In an embodiment, a user is a type of principal that is created within an account, such as for an engineer that joins an organization or when an application needs to make API calls to access resources of the computing resource service provider. In an embodiment, an account has an account root user that has complete access to all services and resources in the account note that this does not mean that the account root user of a first account necessarily has access to resources associated with a second account. Additional users of the account, in an embodiment, are able to be created and provisioned with sets of permissions that are different from (e.g., subsets of) the permissions associated with the account root user. In an embodiment, the user 102 is a user of a first account 112 an organization, ABC Corp, may have corresponding user for an employee that enables the user to access some or all computing resources of the organization's accounts.

The user 102, in an embodiment, generates, determines, or otherwise identifies an identity token 108 usable to facilitate cross-account access of computing resources. In an embodiment, the identity token 108 comprises attributes that include both user and account level attribution associated with the entity associated with the user. In an embodiment, the identity token 108 includes a collection of technical attributes of that a user based on different types of relationships such as inherent and contained attributes.

An inherent attribute, in an embodiment, refers to an inherent property of the user. In an embodiment, the inherent attributes can be described as attributes that the user "is" or that the user "are"—including, but not limited to: a person (or program, for the case where the user is an application); a set of permissions; a location; a browser (or other medium used to communicate the request); and any combination thereof. In an embodiment, one or more inherent attributes are immutable, meaning that an immutable attribute does not change over time. In an embodiment, an immutable inherent attribute of a user is that the user is the user type, which indicates whether the user is a person, an application, or other type of user entity. In an embodiment, a mutable inherent attributes refers to an attribute that is inherently associated with the user (e.g., the user must have one) but that it may change. In an embodiment, a mutable inherent attribute is a location or IP address of the user, which indicates that the user must communicate from a location (even if it is unknown or approximated based on an IP address or portion thereof), although that location may change (i.e., is mutable).

A contained attribute, in an embodiment, refers to an attribute that a user may "have" or possess such as an organization (e.g., a person has an organization that s/he works for), an account (e.g., a person that is an employee of an organization may have a user account to the organization's IT infrastructure), a service provider entity, a device (e.g., a person may have a computing device that s/he uses for electronic communications), and more. In an embodiment, an identity token 108 may include immutable contained attributes and mutable contained attributes. In an embodiment, an immutable contained attribute may refer to an attribute that a person "has" that does not change or is treated as being unchangeable, such as an individual's social security number. In an embodiment, a mutable contained attribute refers to a changeable contained attribute such as where a person is employed.

In an embodiment, a user session with the service provider authorization service 106 is opened and authentication into the computing resource service provider allows the user session to be handled, routed, and passively inspected by the content delivery network (CDN) and load balancing infrastructure. In an embodiment, the identity token 108 is transmitted by the user 102 to a service provider authorization service 106 via a CDN 104. In an embodiment, the CDN 104 is used to gather information on the user session and/or attributes associated with the user such as IP address, browser type and version, and more. In an embodiment, the CDN includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof.

In an embodiment, the service provider authorization service 106 is a service of a computing resource service provider that provides access to a variety of computing resources such as various types of storage resources, compute resources, software applications, etc. to multiple accounts that may be associated with various entities (e.g., an organization may create an account on a computing resource service provider and manage some or all of the organization's computational needs via the computing resource service provider).

In an embodiment, the service provider authorization service 106 receives the identity token 108 from the user 102 via the CDN 104 as part of a request. In an embodiment, the request is a request to access computing resources of a different account from the account associated with the user 102. In an embodiment, attributes of the identity token 108 are assigned sub-scores which are used to generate a score that is used to determine whether and/or how to fulfill the request. In an embodiment, the sub-scores and/or scores are numeric values (e.g., a numeric score between 1 and 100, with higher scores corresponding to greater trust), an enumerated type (e.g., HIGH/MEDIUM/LOW trust levels), or a combination thereof. The score, in an embodiment, are hashed. In an embodiment, the attributes include granular information about the user session that is used to create or confirm the identity token 108.

In an embodiment, authentication into the computing resource service provider or, more specifically, the service provider authorization service 106 allows the user session to be handled, routed, and passively inspected by the resource provider content delivery network and load balancing infrastructure so that the user is able to seamlessly access cross-account resources. In an embodiment, sub-scores for individual attributes are added together and then hashed to generate attribute hashes. The hashes, in an embodiment, are processed and matched by the service provider authorization service 106. In an embodiment, the identity-based access control framework controls identity list, access cube, and authentication modes. In an embodiment, the identity-based access control framework iterates through the identity-based access control framework elements as part of processing the identity token 108 and the identity-based access control framework stores many-to-many relationship mappings between the identity list used to manage multiple identity tokens, access cube used to track permissions, and authentication modes used to enable logins. The components of the identity-based access control framework processor may include modules with many-to-many relationships. In an embodiment, identity based access controls using relationship mapping 110 is described in greater detail in connection with FIGS. 3-5. In an embodiment, the service provider authorization service 106 includes additional components used in a many-to-many mapping relationship with the relationship mapping 110 to facilitate a particular manner of access to computing resources, including one or more of: an identity token repository, and the identity list.

In an embodiment, attributes of the identity token are used to calculate sub-scores which are added and/or hashed together (in any suitable order) and used to determine whether access to computing resources should be granted. In an embodiment, the user 102 is a user of a first account 112, illustrated in FIG. 1 as being an account owned by ABC Corp. In an embodiment, the identity token 108 encodes information that indicates the user's identity (e.g., a user ID within the first account) and an authentication and/or authorization process is performed to verify the user's identity and to verify that the user is authorized to access a computing resource 114 requested by the user, according to an embodiment. The computing resource 114 illustrated in FIG. 1 is, in an embodiment, a computing resource that is provisioned for the first account 112 and users of the first account accordingly, based at least in part on determining that the request is for a resource associated with the first account, authenticating the user is a user of the first account, and determining the user is authorized to access the computing resource based at least in part on permissions attached to the user account that are managed by an account root user, the service provider authorization service 106 provides the user 102 access to the requested computing resource 114. In an embodiment, the service provider authorization service 106 provides access to the requested computing resource 114 by assuming a role associated with the user and then submitting a request on behalf of the user under the assumed role. In an embodiment, the role has a set of permissions determined based at least in part on the set of permissions associated with the user.

The computing resource 114 illustrated in FIG. 1 may be any suitable computing resource such as various types of storage resources, compute resources, software applications, and combinations thereof. In an embodiment, computing resources are configured to implement specific features which are exposed via an interface of a service (e.g., a service that provides machine-learning related features exposing APIs for providing training data, specifying hyerparameters, and reviewing the results of a machine-learning run). In an embodiment, the computing resource 114 is a computing resource provisioned for one or more users of the first account 112, according to at least one embodiment. In an embodiment, the user 102 has the ability to access the computing resource 114 (as indicated by the check mark illustrated in FIG. 1) via the service provider authorization service 106 based at least in part on one or more attributes the user 102 provides in the identity token 108. In an embodiment, the service provider authorization service 106 verifies that the user 102 is a user of the account that controls the computing resource 114, verifies that the set of permissions associated with the user indicates a grant of access (e.g., through a policy that affirmatively grants access and/or the lack of a policy that explicitly denies access), verifies the IP address of the user is not from a blacklisted location (or is not otherwise suspect, which may be based on the user's previous communications history), and combinations thereof.

In an embodiment, the user 102, being a user of the first account 112, is able to submit and achieve fulfillment of a request to access cross-account computing resources such as the computing resource 120 illustrated in FIG. 1. In an embodiment, the user 102 of the first account 112 generates an identity token 108 that encodes contained and/or inherent attributes associated with the underlying entity (e.g., person) associated with the user 102. In an embodiment, the attributes encoded in the identity token 108 encode the user's organization and role within the organization (e.g., the user 102 is a payroll supervisor of ABC Corp). In an embodiment, the identity list manages multiple cross-account identities, the access cube tracks permissions such as the account, network configuration, and access records, and the authentication modes enables logins via the identity list (e.g., the identity presented by the user).

In an embodiment, the identity token 108 is received by the service provider authorization service 106 which tabulates sub-scores for attributes included in the identity token and the sub-scores are added and/or hashed together to produce a score or hashed score. In an embodiment, the score refers to a confidence value that determines whether the request to access computing resources of another account should be fulfilled. In an embodiment, attributes such as the organization that the entity is a member of and the set of permissions associated with the user (e.g., the user is able to access payroll-related data and applications within the ABC Corp account) are used to determine the user 102 is allowed to access computing resources within the second user account. In an embodiment, the service provider authorization service 106 provides granular access to a second account such that certain computing resources may be accessed according to a particular specified manner. FIG. 1, in an embodiment, illustrates a payroll supervisor from an ABC Corp account that requests access to payroll records for ABC Corp which are stored and managed by a second account, BCD Payroll Corp, which can be done for a variety of reasons, such as in the case where ABC Corp uses a third-party application to manage payroll. In an embodiment, the service provider authorization service 106 assumes a role associated with the second account 116 and uses the assumed role to access the computing resource 120 of the second account 116. In an embodiment, the assumed role grants a limited set of permissions based on the identity token 108. In an embodiment, the user 102 is granted granular access to computing resources in the second user, such as a particular manner of accessing a particular subset of the computing resources (e.g., the user of the first account is able to access the payroll application 118 of the second user to view or modify a first subset of data 122 associated with ABC Corp but not a second subset of data 124 associated with a different organization, XYZ Corp).

Figure 2:
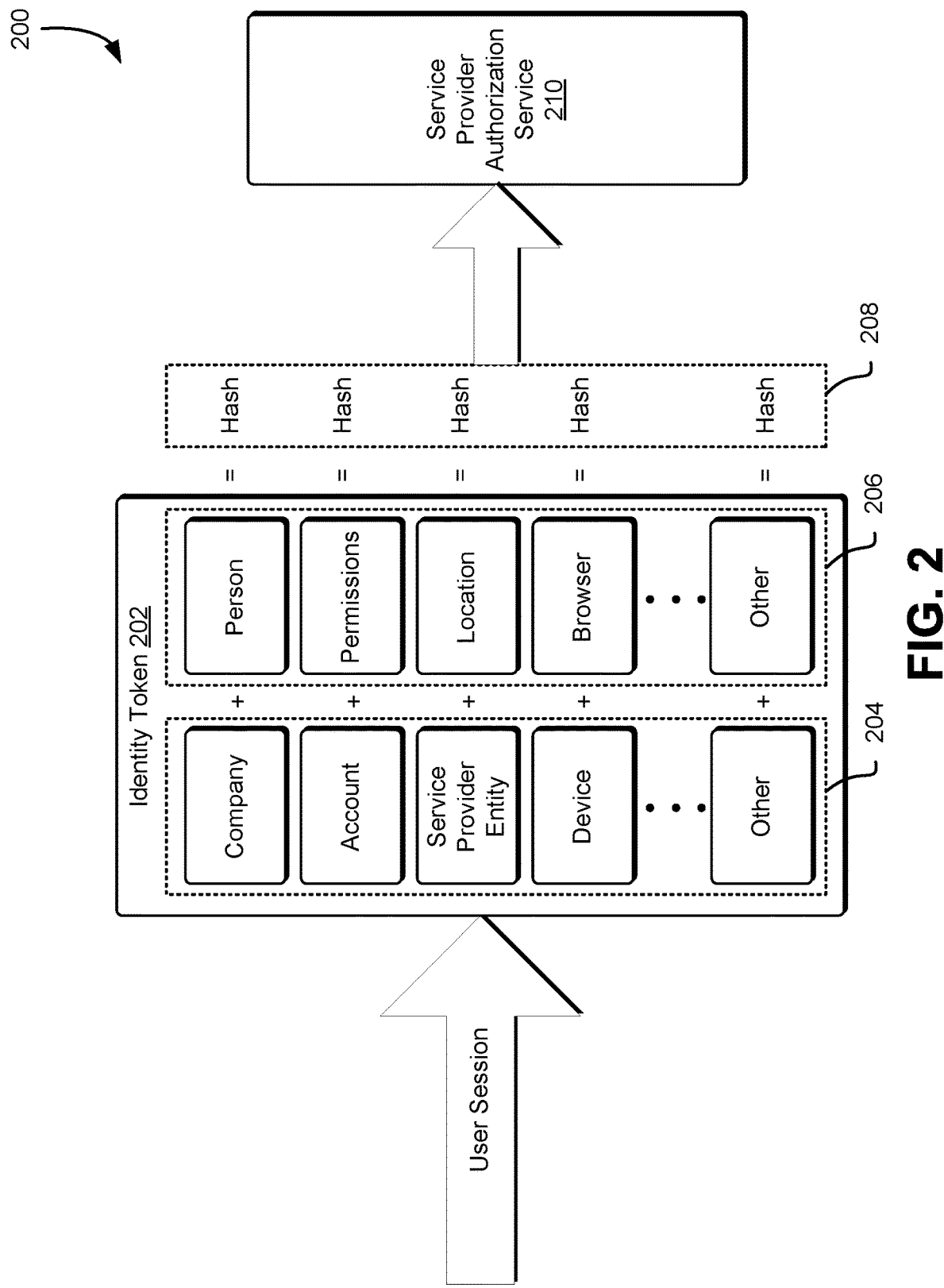
FIG. 2 illustrates a diagram of a system that implements various aspects of the present disclosure in accordance with an embodiment.

In an embodiment, FIG. 2 illustrates a diagram 200 of an identity token 202 that can be utilized to facilitate cross-account access of computing resources within the context of one or more computing resource service providers. In an embodiment, the identity token 202 is utilized to fulfill requests described in connection with FIG. 1. In an embodiment, the identity token 202 comprises one or more contained attributes (e.g., "have" attributes) and one or more inherent attributes (e.g., "are" attributes) which may be utilized by a service provider authorization service 210 to determine whether to grant or deny access to a user that, as part of a user session, requests access to cross-account or cross-provider computing resources. In an embodiment, one or more attributes may be classified as required attributes (e.g., whose omission causes the request to fail) or optional attributes.

In an embodiment, an entity associated with a user of an account establishes a user session with which the user can communicate with a service provider authorization service 210. In an embodiment, the user session is a communications session such as a cryptographically protected communications session suitable for providing cryptographically verifiable assurances of confidentiality, authenticity, integrity, or any combination thereof confidentiality may refer to assurances that a message created by a party is not able to be deciphered by a party without access to cryptographic material (e.g., a cryptographic key) absent extraordinary computational effort. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted.

In an embodiment, an identity token 202 comprises one or more contained attributes 204. Contained attributes refer to attributes that the entity or user "has" which include, in an embodiment, includes a company or organization that the entity is employed by, an account associated with the user of the user session, a service provider associated with the account, a device, and others. In an embodiment, the identity token 202 comprises one or more inherent attributes 206. Inherent attributes refer to attributes the entity or user "is" which include, an embodiment an entity type, such as a person (e.g., human), software application, juridical entity, and more. In an embodiment, inherent attributes include a set of permissions which are associated with a computing resource policy, a geographical location or information usable to determine a geographical location (e.g., an IP address), a browser. In an embodiment, the use of an older browser that lacks support for critical security updates is assigned a sub-score with a lower value. In an embodiment, a geographical location that the user has not previously been authenticated from is associated with a lower sub-score. In an embodiment, a user with no permissions or lacking permissions pertinent to the requested computing resource (e.g., a user of the engineering division requesting access to accounting data) is associated with a lower sub-score.

In an embodiment, attributes of the identity token 202 are assigned sub-scores that are added and hashed together to generate hash outputs 208. In an embodiment, the hash output is a digital fingerprint that is an encoded representation of information that resolves the user to an identity (e.g., a user of an account may be resolved to a particular human that is also associated with other accounts). In an attribute, different combinations of sub-scores resolve to the same hash output 208 result in the sense that there are multiple ways to resolve that a user matches an identity or that the user does not match an identity. In an embodiment, the hash is a long script notation that encodes one or more sub-scores wherein the addition of two or more sub-scores results in a hash that resolves to a particular identity. In an embodiment, the hash outputs are generated using a one-way function.

In an embodiment, a permission specifies a principal, a resource, an action, a condition, and an effect. In an embodiment, a permission specifies a plurality of one or more elements such as a set or class of users, a collection of resources, several different actions, and/or multiple conditions. In an embodiment, the permission 202 specifies one or more wildcard or otherwise modifiable characters that may be used to denote that the permission may be modified to make the permission applicable to different users and their associated resources. Wildcards may be represented in various formats in an embodiment, an asterisk is a wildcard that represents any number of characters and a question mark is a wildcard represents any single character. In an embodiment, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

In an embodiment, a principal refers to a user, a group, an organization, a role, or a collection and/or combination of these or other such entities. A principal, in an embodiment, is any entity that is capable of submitting API calls that cause an action associated with a resource to be performed and/or any entity to which permissions associated with a resource may be granted.

In an embodiment, the principal is identified by a resource name that uniquely identifies the principal. A principal includes, in an embodiment, one or more name spaces that include additional information regarding the principal. In an embodiment, "rn" refers to a resource name prefix and identifies the subsequent information as part of a resource name; "ws" refers to a partition namespace that the resource is in; "iam" refers to a service namespace that identifies a service of a computing resource service provider (e.g., the computing resource service provider may provide services related to identity and access management); namespaces may additionally be omitted (note that there are two semicolons in the example above between "iam" and "ducksfan8") in some formats and/or for some resources, a region namespace may be option; and "ducksfan8" may refer to an identifier for the account, such as the account that owns the resource specified in the permission.

In an embodiment, a resource refers to a computing resource of a computing resource service provider. In an embodiment, computing resources of a computing resource service provider include one or more of: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; software application services; and more. Computing resources, in an embodiment, are organized in a hierarchy, and use structures such as folders, directories, buckets, etc. to organize sets of computing resources into groupings. In an embodiment, policies and/or permissions are applied directly to a bucket and grant cross-account access to an environment.

In an embodiment, the resource is identified by a resource name that uniquely identifies the resource. In an embodiment, the resource shares a same naming convention as the principal or other elements of the permission. However, this need not be the case, as each separate element of a permission may use a naming convention, namespace, format, etc. that is independent of other elements. In an embodiment, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases for example, a region namespace and/or account namespace may be omitted; and a resource which may also include an indicator of the type of resource. In an embodiment, the resource may indicate an image in the Portable Network Graphics (PNG) format and is stored in a bucket.

In an embodiment, an action refers to the specific action or actions that will be allowed or denied by the permission. Different types of services (e.g., having different service namespaces) may support different actions, in accordance with an embodiment. In an embodiment, an identity and account management service support an action for changing passwords, and a storage service may support an action for deleting objects. In an embodiment, an action is performed in association with the resource and is identified by a type of API call, a library call, a program, process, series of steps, a workflow, or some other such action.

In an embodiment, the action that is allowed or denied (determined based on the effect specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. In an embodiment, an action element described as "Action": "iam:*AccessKey*" may refer to actions supported by an identity and access management service in connection with access keys of a service including, but not limited to: actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

In an embodiment, a condition element is one or more conditions that specify when a policy is in effect. In an embodiment, the condition element is optional and can be omitted. In an embodiment, conditions are described as Boolean expressions that are used to determine whether the policy is in effect (i.e., if the expression evaluates to TRUE) or not in effect (i.e., if the expression evaluates to FALSE). Policies that are not in effect are, in an embodiment, unenforced or ignored by an authorization module (such as those described elsewhere in this). In an embodiment, conditions in a permission are evaluated against values provided as part of a web API request corresponding to one or more APIs specified in the action element.

In an embodiment, the condition, the "ws:CurrentTime" value of the request is compared against a literal value "2014-12-13" using the condition operator "DateLessThan" which may be used to evaluate whether the condition is met. In this example, the condition may be true when the current time (e.g., the time the request is received by the service provider) is less than the supplied date of Dec. 13, 2014. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys.

In an embodiment, an effect refers to whether the permission is used to grantor deny access to the computing resources specified in the permission in the resource element. An effect may be an ALLOW effect, which grants access to a resource, and a DENY effect, which denies access to a resource. In some embodiments, access to computing resources of a computing resource service provider are denied by default and a permission affirmatively including an ALLOW effect is required.

It should be noted that the examples described above merely described one of many ways in which permissions may be expressed. Of course, in other embodiments, variations on the principles described above in connection with FIG. 2 may be applied in various ways.

Figure 3:
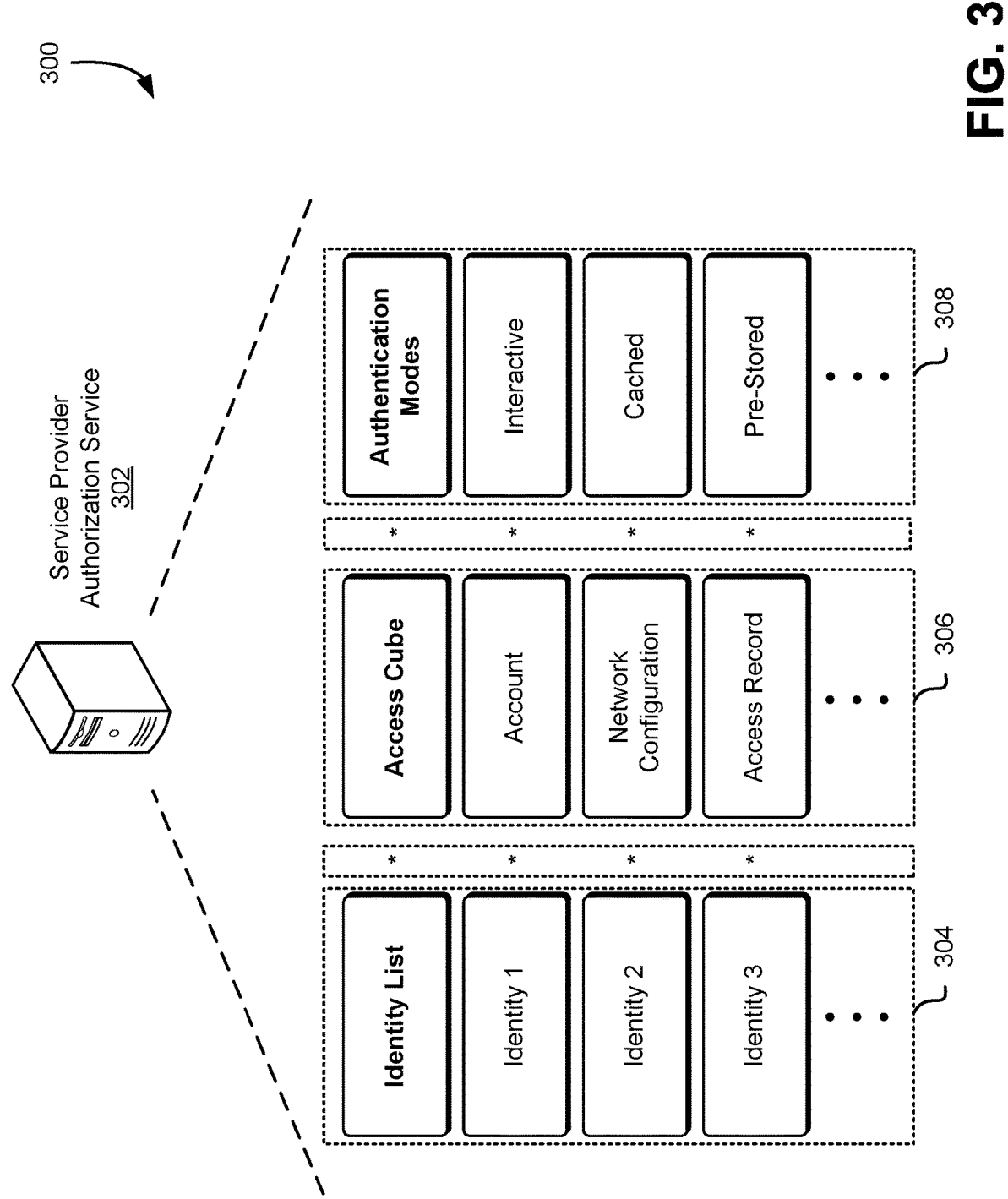
FIG. 3 illustrates a diagram of a service provider authorization service, in accordance with an embodiment.

FIG. 3 illustrates a diagram 300 of a service provider authorization service 302, in accordance with an embodiment. In an embodiment, the service provider authorization service 302 includes or causes processing of a loop that iterates through the various elements 304-308 illustrated in FIG. 3 to control access to cross-account resources. In an embodiment, the identity list 304 refers to identities which may also be referred to as identity tokens. In an embodiment, the access cube 306 refers to information used to determine changes needed to facilitate cross-account access, such as whether changes are to be at the account level, network configuration level, whether a virtual machine instance configuration is to be adjusted, or an access record, which may be pre-stored to deliver access to the requestor. In an embodiment, the access cube 306 includes a list of configurations that each specify a manner in which to access computing resources.

In an embodiment, the authentication modes 308 refer to how to enable logins using the identity tokens. In an embodiment, an interactive login refers to a authentication mode in which the user has to type in their login and password or to get an administrator account to issue an authentication via a command line interface (CLI). In an embodiment, a cached mode refers to using cached SSH keys wherein the users of the source account can obtain access to cross-account resources via a cached key. In an embodiment, a pre-stored mode of authentication refers to a pre-defined or managed mode in which an administrator or privileged user can specify to allow a subset of rules to the network configuration, meaning that, it may be the case that only certain network configurations are allowed.

Figure 4:
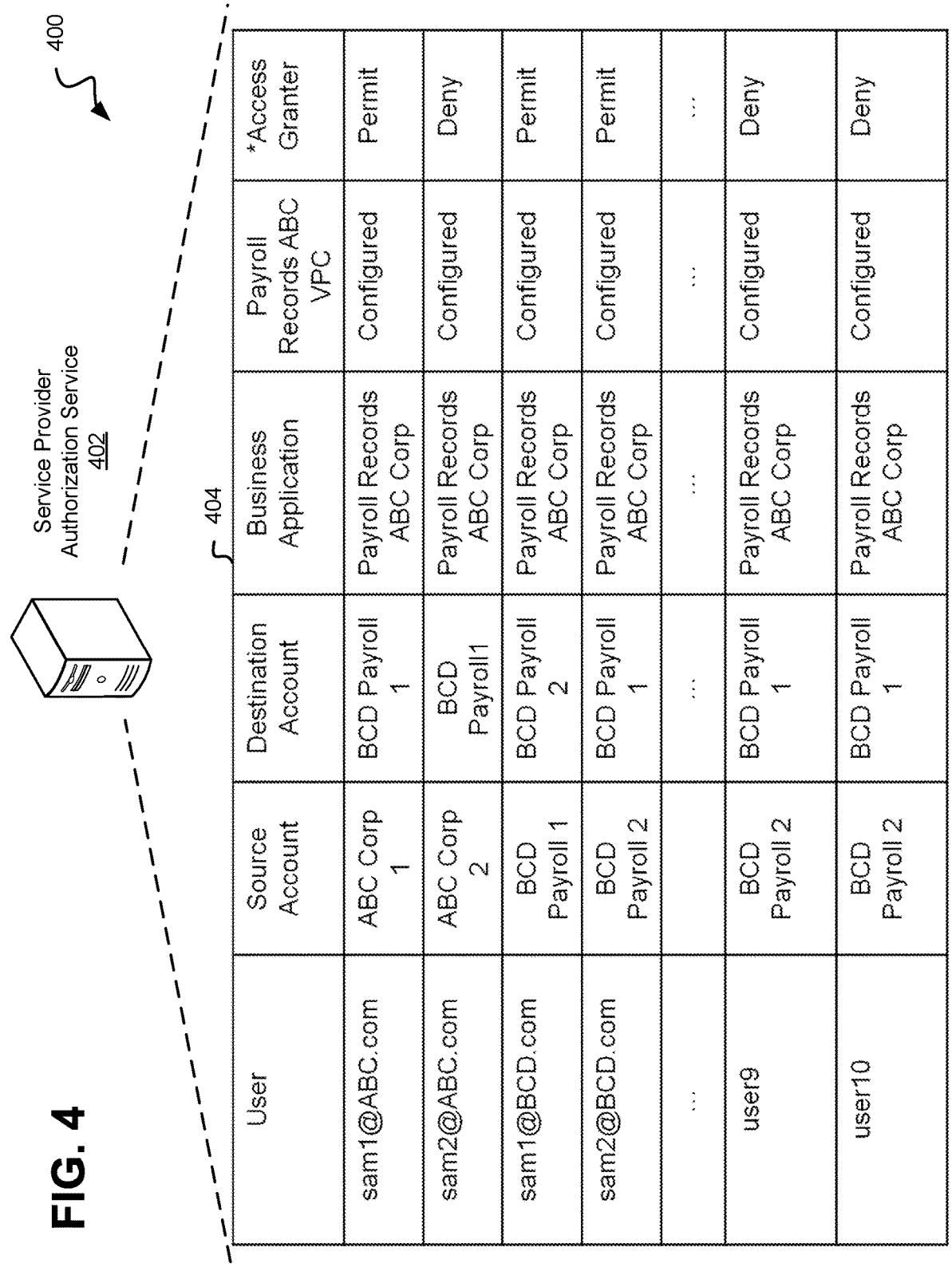
FIG. 4 illustrates a diagram of a system in which an embodiment in accordance with this disclosure can be implemented.

FIG. 4 illustrates a diagram of a system 400 in which an embodiment in accordance with this disclosure can be implemented. The system illustrated in FIG. 4 includes a service provider authorization service 402 configured with identity based access via an access cube 404. In an embodiment, the service provider authorization service 402 iterates through different element types in a many-to-many relationship that control the manner in which computing resources are accessed through the service provider authorization service 402.

In an embodiment, the service provider authorization service controls downstream access through the use of an access cube 404 that defines configuration changes that are used to deliver access to a user that provides identity tokens. In an embodiment, the access cube 404 is represented in a row-column data structure that is stored in any suitable manner, including but not limited to: database systems, structured record stores, spreadsheets, data files, log files, text files, and more. In an embodiment, the access cube 404 is stored, at least in part, using a data structure in short-term memory (e.g., random access memory of a computer system) including, but not limited to: a matrix, a two-dimensional array, an array of arrays, an array list, and more.

In an embodiment, the first row of the access cube 404 illustrated in FIG. 4 represents different field types supported by the access cube, including any combination of: user information, source account information, destination account information, destination application information, configuration information, and access permissions.

In an embodiment, the second row of the access cube 404 illustrated in FIG. 4 is the first data entry row and reflects a first user, sam1@ABC.com of a source account ABC Corp 1 and a destination account BCD Payroll 1 having at least one business application (e.g., Payroll Records ABC), a configuration (e.g., VPC configuration), and access permission (e.g., permit or deny access). The access cube 404 may be utilized in connection with an identity token to determine whether to grant or deny access to cross-account resources such as accessing an application of a destination account from a user of a source account. In an embodiment, the user is the user of the source account, the destination account is the account for the cross-account access, the business application is the application of the destination account subject to the access permissions.

Figure 5:
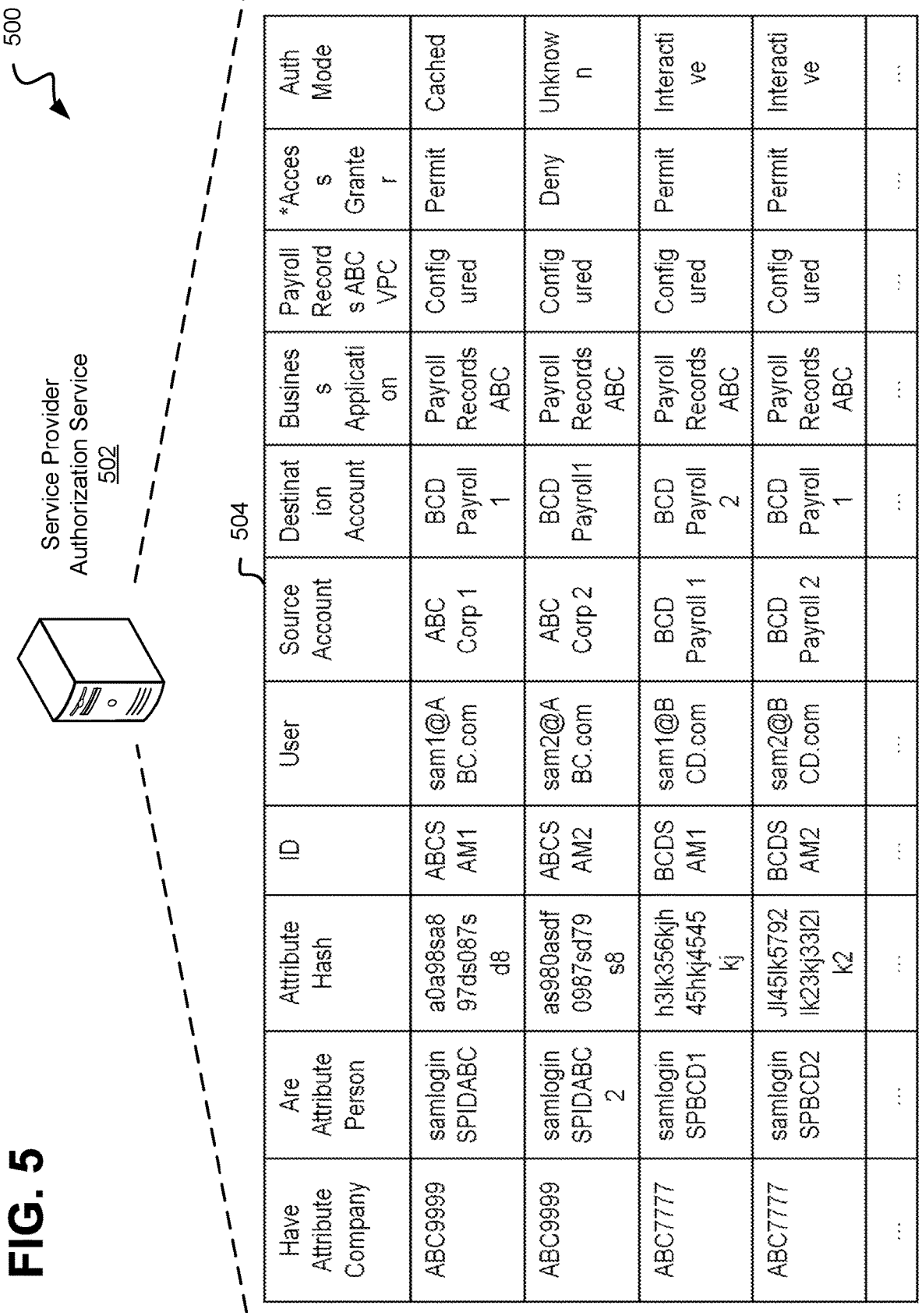
FIG. 5 illustrates a diagram of data storage and relationship mapping, in accordance with an embodiment.

FIG. 5 illustrates a diagram 500 of data storage and relationship mapping 504, in accordance with an embodiment. The system illustrated in FIG. 5 includes a service provider authorization service 502 configured with identity based access via a data storage and relationship mapping 504. In an embodiment, the data mapping and relationship can have three different components performing data mapping and relationship mapping. In an embodiment, each mapping includes at least one "Have" attribute such as "ABC9999" and at least one "Are" attribute, an attribute hash that is pre-defined or calculated from an identity in the system (e.g. identity token). In an embodiment, information included in the access cube is also encoded in the mapping table, such as the user, source account, destination account, business application, and others. In an embodiment, the authentication mode is set to one of a plurality of modes of authentication, such as cached, interactive, and unknown (used in cases when access permissions is set to deny access). In an embodiment, the attribute hashes included in the data storage and relationship mapping 504 are compared against hashes generated from request attributes provided by a requestor making a request for access to cross-account resource. in an embodiment, the hashes are generated using a one-way function.

Figure 6:
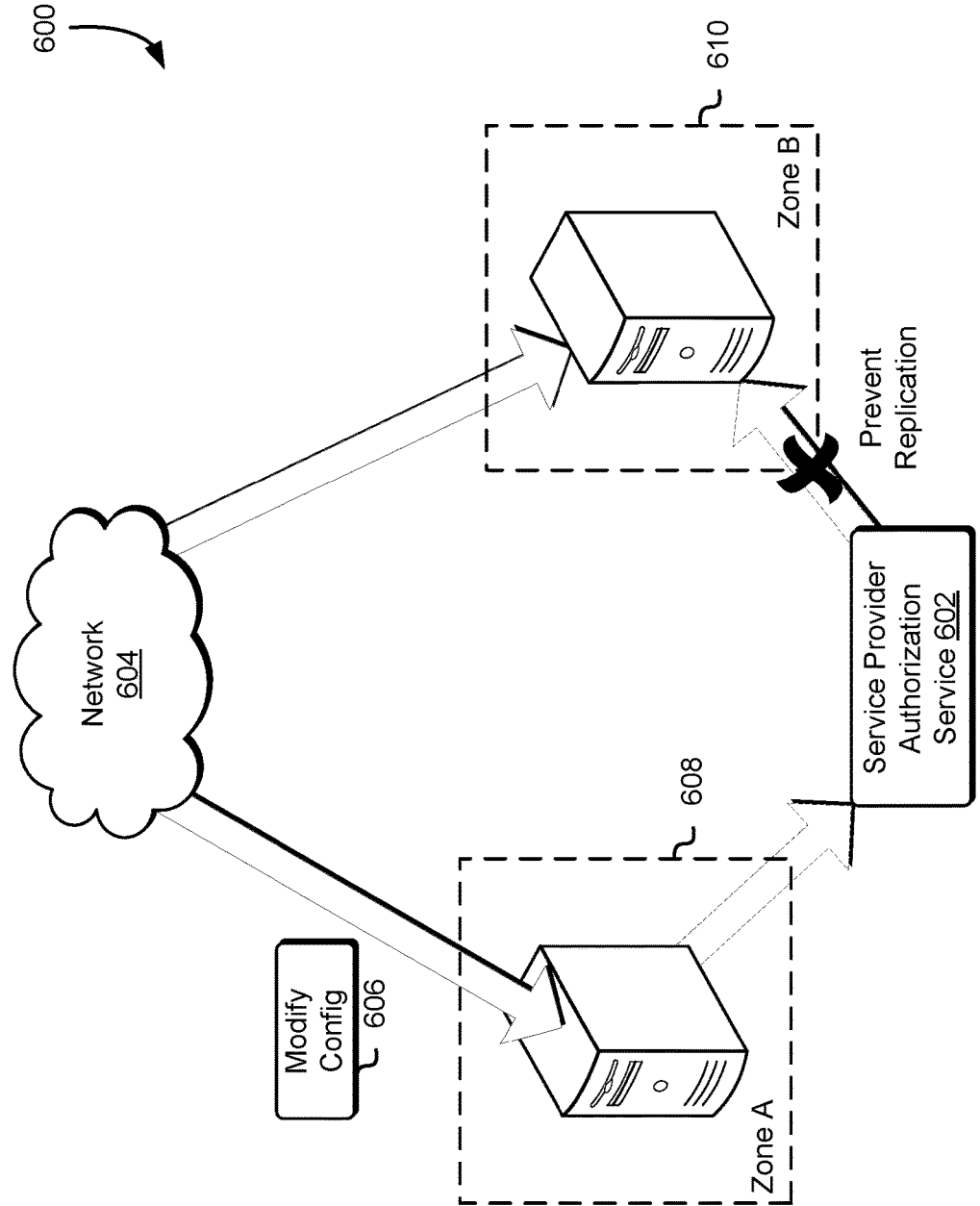
FIG. 6 illustrates a system of managing cross-region utilization of computing resources, in accordance with an embodiment.

FIG. 6 illustrates a system 600 of managing cross-region utilization of computing resources, in accordance with an embodiment. In an embodiment, the service provider authorization service 602 is used as a regional controller to facilitate different sets of rules applying to different compute zones. In an embodiment, system 600 includes a service provider authorization service 602, a network 604, and a request 606 to modify a configuration, a first compute zone 608, a second compute zone 610. In an, the service provider authorization service 602 is implemented in accordance with techniques described in connection with other figures.

In an embodiment, as computing resource service providers are used in large organizations, cross-region utilization scenarios will increase as a part of business demands. In an embodiment, regionalization of computing resources is desirable to enable customer data to be available in a highly resilient manner. In an embodiment, different compute zones managing computing resources can be managed using custom configurations that are specific to a particular compute zone. In an embodiment, a customer is able to delete a single service account in a regionalized architecture without then performing the deletion across all other environments for the account where the service account exists.

In an embodiment, the network 604 includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof.

In an embodiment, the request 606 refers to a request to modify a configuration such as permissions associated with an account. In an embodiment, the request is any suitable request and includes requests to modify service infrastructure, provision applications, setup additional services, and more. In an embodiment, the request is a request to modify permissions for a user (e.g., granting a user all permissions within a debug environment).

In an embodiment, a compute zone such as the compute zones 608 and 610 illustrated in FIG. 6 refer to regions of computing resources logically and/or physically isolated from each other such that failures in one compute zone do not affect other compute zones. In an embodiment, compute nodes are logical groupings of computing resources that are connected by a low latency, high-throughput connection. In an embodiment, compute resources may include hardware components (such as servers, computers, and laptops), software components (such as virtual machine instances), or a combination of both hardware and software. In an embodiment, each compute node may be connected to every other compute node within a compute zone that allows for high performance intra-zone replication and access of data. In an embodiment, different compute zones are utilized for different purposes a first compute zone 608 can be utilized as a debug or development environment in which security settings are relaxed to expedite development, and a second compute zone 610 which is used as a production environment in which maintaining the security of data (e.g., customer data) is of great importance.

In an embodiment, the service provider authorization service 602 is used to prevent replication of configuration changes from one region to another. In an embodiment, having different configurations for different compute zones is desirable for various reasons including, but not limited to: testing, development, and debugging in an environment is easier to perform when security constraints are relaxed in a manner that is inconsistent with those of a production environment that make validation of features being developed more difficult; region specific constraints due to sovereignty or compliance issues, such as where data stored within a first jurisdiction is subject to a first set of rules and data stored within a second jurisdiction is subject to a second set of rules. In an embodiment, the request 606 is processed by updating the record of a relationship mapping table associated with the first compute zone and not replicating the change to the record associated with the second compute zone. In an embodiment, the relationship mapping table is in accordance with those described in FIG. 5.

Figure 7:
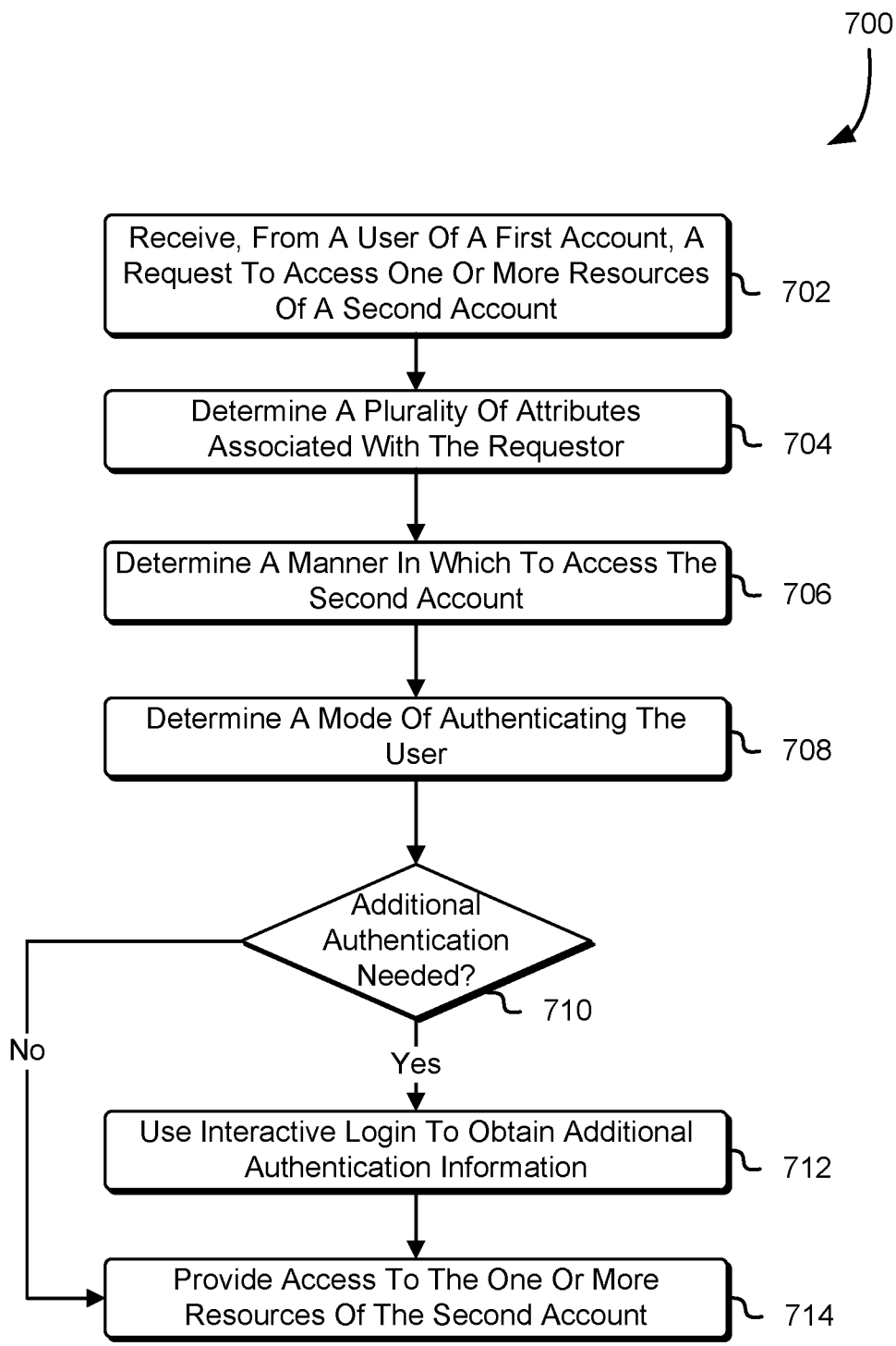
FIG. 7 illustrates a process for managing access to cross-account computing resources, in accordance with one embodiment.

FIG. 7 shows an illustrative example of a process 700 for managing access to cross-account computing resources in accordance with an embodiment. In an embodiment, some or all of the process 700 (or any other processes described herein, or variations and/or combinations thereof) is performed under the control of one or more computer systems configured with computer-executable instructions and is implemented as code (e.g., computer-executable instructions, one or more computer programs, or one or more applications) executing collectively on one or more processors, by hardware, software, or combinations thereof. In an embodiment, the code is stored on a computer-readable storage medium in the form of a computer program comprising a plurality of computer-executable instructions by one or more processors. The computer-readable storage medium is, in accordance with an embodiment, a non-transitory computer-readable medium. In an embodiment, at least some of the computer-executable instructions usable to perform the process 700 are not stored solely using transitory signals (e.g., a propagating transient electric or electromagnetic transmission). In an embodiment, a non-transitory computer-readable medium includes non-transitory data storage circuitry (e.g., buffers, caches, and queues) within transceivers of transitory signals. In an embodiment, the process 700 is implemented at least in part using a service provider authorization service such as those described in connection with FIGS. 1-6.

In an embodiment, the system receives 702 a request from a first user of a first account to access one or more resources of a second account. In an embodiment, the request includes one or more technical attributes of the user, such as the user's identity information, permissions associated with the user account, an organization that the user is associated with, as well as other attributes described in connection with FIG. 2. In an embodiment, the requestor provides, as part of the request, an identity token as described in connection with FIG. 1.

In an embodiment, the system determines 704 a plurality of attributes associated with the requestor. In an embodiment, some of the attributes are provided by the user as part of the request and some of the attributes are determined from information obtained from a content delivery network that routes the request to the system. In an embodiment, the CDN routes IP address and browser information associated with the particular session in which the user request is a part of.

In an embodiment, the plurality of attributes include contained attributes and/or inherent attributes as described in connection with FIG. 2. In an embodiment, the attributes are evaluated to generate sub-scores that reflect a trust confidence in the requestor, and the sub-scores, in aggregate, can resolve to a hash output that is used to resolve the requestor to a particular identity according to a relationship mapping table.

In an embodiment, the system determines 706 a manner in which to access the second account. The manner of access, in an embodiment, includes account-level changes that are needed to facilitate fulfillment of the request, network configuration changes (e.g., adjusting firewall or VPC settings), and more. In an embodiment, an access cube as illustrated in FIG. 3 is utilized in determining the manner in which to access the second account. In an embodiment, the computing resource must be accessed in a particular manner for example, the first user is restricted to accessing the computing resource only through a particular software application of the second account. In an embodiment, the determined manner in which to access the second account may be associated with one or more operations (e.g., computer-executable instructions) that are associated with a corresponding mode of operation, as described above, such as a set of commands that cause account-level changes, network configuration changes, etc. to facilitate fulfillment of the request.

In an embodiment, the system determines 708 a mode of authenticating the user. In an embodiment, modes for authenticating the user include an interactive mode that requires additional authentication data to be provided, a cached mode that enables access based on cached credentials (e.g., user is authenticated using cached credentials such as a cached SSH key usable to access a VPC having access to the requested computing resources), custom configurations, and more. In an embodiment the system determines, based on the selected mode, whether 710 additional authentication is needed according to the determined mode of authentication. In an embodiment, the mode of authentication is selected based at least in part on the sub-scores discussed above, whereby sub-scores associated with lower trust confidence (e.g., suspect IP address) may be required to perform an interactive login. In an embodiment, an interactive mode of authentication is used to indicate that additional authentication is needed, and the system is able to use the mode to provide an interactive login to obtain additional authentication information 712. In an embodiment, the additional authentication information includes authentication information associated with a user of the second account that is associated with the requestor (e.g., as determined by the plurality of attributes). In an embodiment, the additional authentication information is to be provided by an administrator-level user of the second account to approve the request. In an embodiment, if no additional authentication information is needed or the authentication information is validated, the system provides 714 access to the one or more resources of the second account according to the determined manner.

Figure 8:
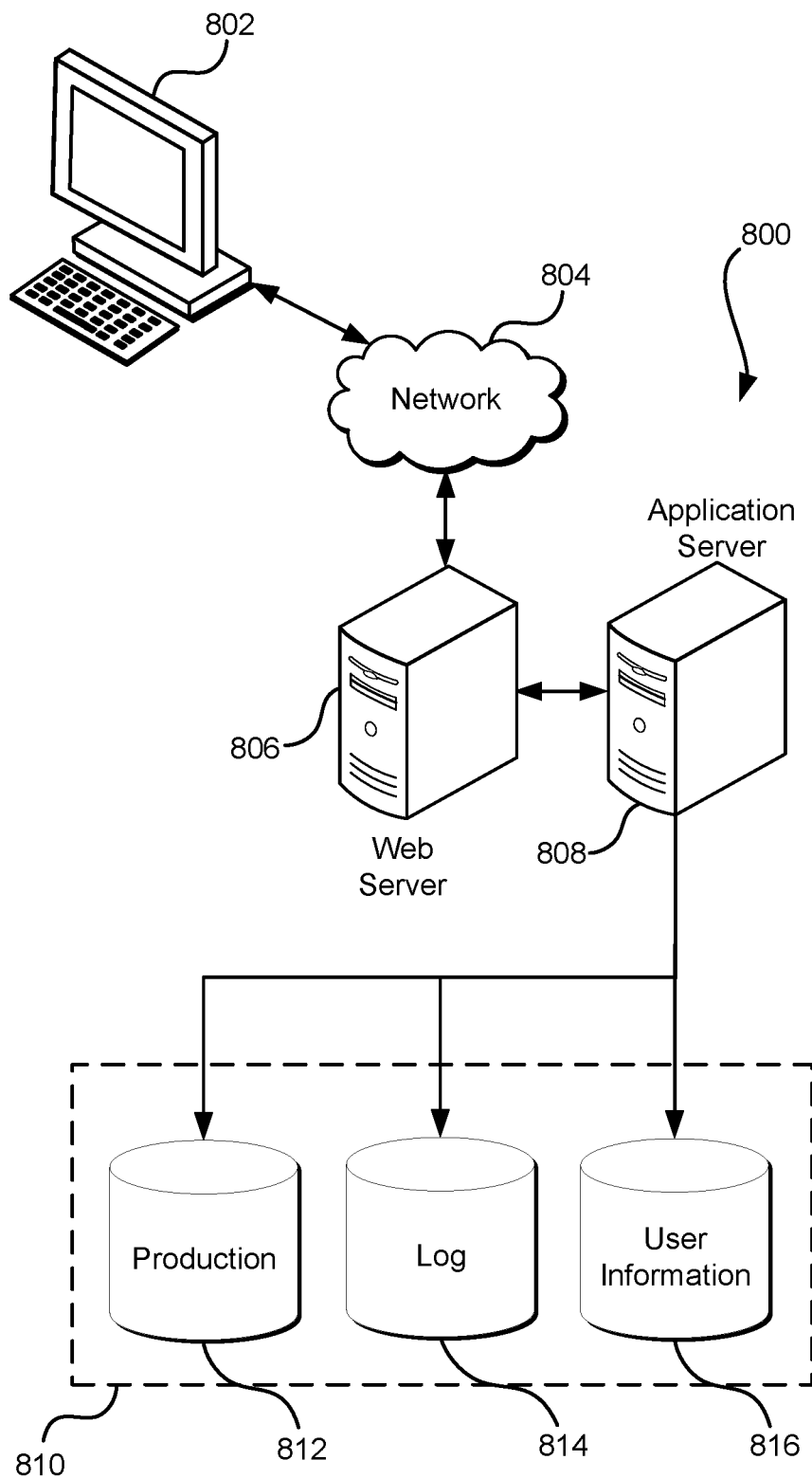
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the datan access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

In an embodiment, the hash outputs are generated using any suitable one-way function (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input x1, the probably of randomly generating another input x2, different from x1, such that $f(x1)=f(x2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x1)=f(x2)$ for different x1 and x2 is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The invention claimed is:

1. A system, comprising memory storing computer-executable instructions that, if executed by one or more processors, cause the system to:
   determine, based on a received request, a plurality of attributes associated with a user of a first account making the request;
   determine a manner in which to restrict access to one or more resources of a second account, wherein the manner to restrict access to the second account is determined based at least in part on the plurality of attributes associated with the user of the first account, further wherein each attribute of the plurality of attributes is assigned a sub-score used to calculate a score used at least in part to determine the manner;
   determine, based on the plurality of attributes, one or more operations to grant the user access to the one or more resources of the second account, wherein the one or more operations include operations to:
   assume a role associated with the second account, wherein the role grants a set of permissions based at least in part on the plurality of attributes associated with the user; and
   based at least in part on assuming the role, obtain access to the one or more resources; and
   provide the user of the first account with a result determined from accessing the one or more resources of the second account according to the one or more operations to fulfill the request and also according to the determined manner in which to restrict access to the one or more resources.

2. The system of claim 1, wherein the one or more operations to grant the user access to the one or more resources comprises operations to select one or more network configuration changes to grant access to the one or more resources of the second account.

3. The system of claim 1, wherein an entity associated with the user of the first account is also associated with a second user of the second account.

4. The system of claim 1, wherein the plurality of attributes comprises a set of contained attributes and a set of inherent attributes.

5. The system of claim 4, wherein the set of contained attributes encodes an organization associated with the user.

6. The system of claim 4, wherein the set of inherent attributes encodes a set of permissions.

7. The system of claim 1, wherein the one or more operations to grant the user access to the one or more resources comprises operations to authenticate the user according to a selected mode of authentication.

8. A non-transitory computer-readable storage medium comprising executable instructions that, if executed by one or more processors of a computer system, cause the computer system to at least:
   receive, from a user of a first account, a request to access computing resources of a second account, wherein the first account and the second account are both managed by the computer system;
   determine a plurality of attributes associated with the user based on the request;
   determine a manner in which to restrict access to the computing resources of the second account, wherein the manner to restrict access to the computing resources of the second account is determined based at least in part on a plurality of attributes associated with the user, further wherein each attribute of the plurality of attributes is assigned a sub-score used to calculate a score used at least in part to determine the manner;

determine, based on the plurality of attributes, one or more operations to grant the user access to the computing resources of the second account, wherein the one or more operations comprise instructions to assume a role associated with the second account for granting access to the computing resources of the second account according to a set of permissions determinable based at least in part on the plurality of attributes associated with the user; and fulfill the request by providing access to the computing resources of the second account according to the one or more operations and also according to the determined manner in which to restrict access to the computing resources of the second account.

9. The non-transitory computer-readable storage medium of claim 8, wherein the one or more operations to grant the user access to the one or more resources comprises account level changes to enable access to the second account.

10. The non-transitory computer-readable storage medium of claim 8, wherein one or more operations comprise using a mode of authentication to authenticate the user, the mode determined based on the plurality of attributes.

11. The non-transitory computer-readable storage medium of claim 10, wherein the user is authenticated using an interactive login that prompts the user to provide login credentials.

12. The non-transitory computer-readable storage medium of claim 10, wherein the user is authenticated using cached credentials.

13. The non-transitory computer-readable storage medium of claim 8, wherein the one or more operations include querying a mapping table to determine a manner in which to grant the user access to the computing resources.

14. The non-transitory computer-readable storage medium of claim 8, wherein at least some of the sub-scores are used to generate a hash output.

15. The system of claim 1, wherein the one or more operations comprise using a mode of authentication to authenticate the user, the mode determined based on the plurality of attributes.

16. The non-transitory computer-readable storage medium of claim 8, wherein a mode of authentication is selected based on the sub-scores.

17. A computer-implemented method, comprising:

determining, based on a received request, a plurality of attributes associated with a user of a first account making the request;

determining a manner in which to restrict access to one or more resources of a second account, wherein the manner to restrict access to the second account is determined based at least in part on the plurality of attributes associated with the user of the first account, further wherein each attribute of the plurality of attributes is assigned a sub-score used to calculate a score used at least in part to determine the manner;

determining, based on the plurality of attributes, one or more operations to grant the user access to the one or more resources of the second account, wherein the one or more operations include operations to:

assume a role associated with the second account, wherein the role grants a set of permissions based at least in part on the plurality of attributes associated with the user; and based at least in part on assuming the role, obtain access to the one or more resources; and providing the user of the first account with a result determined from accessing the one or more resources of the second account according to the one or more operations to fulfill the request and also according to the determined manner in which to restrict access to the one or more resources.

18. The computer-implemented method of claim 17, wherein the one or more resources of the second account are determined based on the plurality of attributes associated with the user of the first account.

19. The computer-implemented method of claim 17, wherein the plurality of attributes associated with the user of the first account is used to generate a score used at least in part to authenticate the user of the first account.

20. The computer-implemented method of claim 17, wherein a third-party application is used to obtain access to the one or more resources of the second account.

* * * * *